United States Patent Office 3,269,258
    Patented August 30, 1966

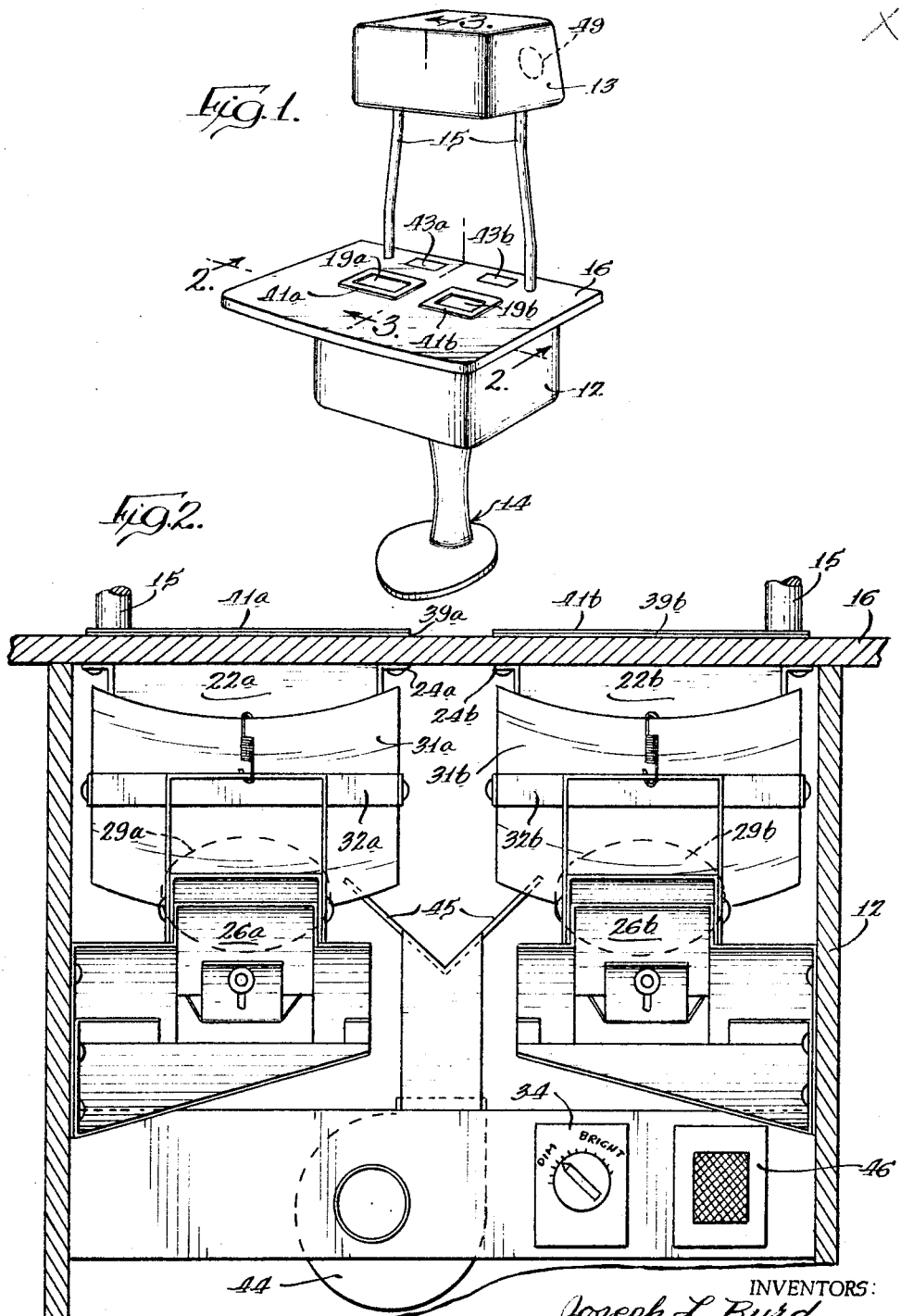

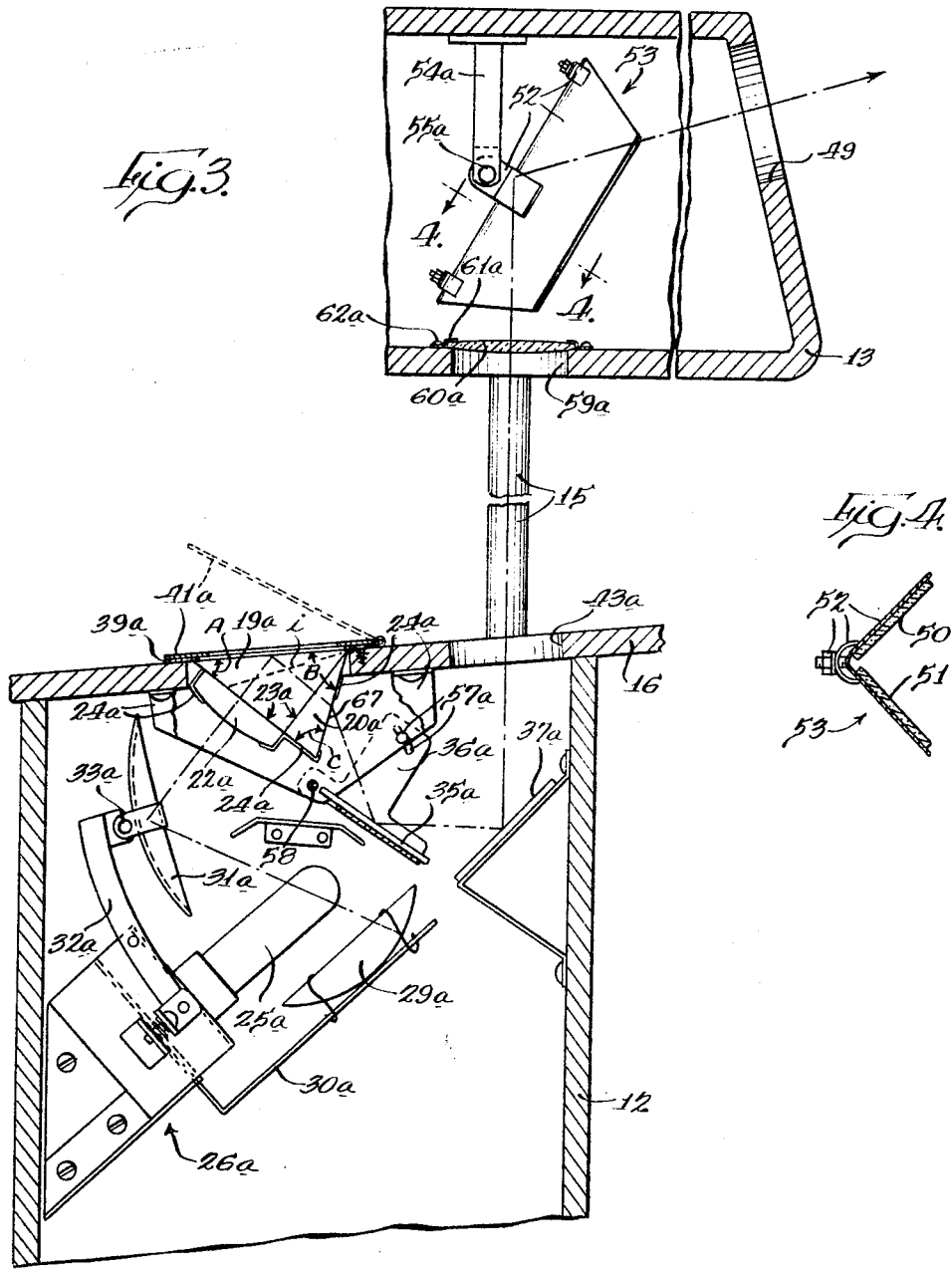

3,269,258
    MEANS FOR CORRECTING DEPTH-OF-FIELD
    ERROR IN A PROJECTION SYSTEM
    Joseph L. Byrd and Paul G. Andrus, Columbus, Ohio,
    assignors, by mesne assignments, to Brunswick Corporation, Chicago, Ill., a corporation of Delaware
    Filed Apr. 9, 1964, Ser. No. 358,525
    18 Claims. (Cl. 88—24)

This invention relates to projection systems and especially to such systems useful in projecting bowling scores in a bowling establishment. More particularly, the invention relates to an improvement in such projection systems.

It is a general object of the invention to provide a new and useful improvement in projection systems.

Attention has recently been directed to development of projection systems for projection of bowling score information to a viewing screen to which reference may be made by bowlers and spectators during a bowling game for obtaining a given bowler's score status at any time during the game. Preferably, such a system should be capable of continuously projecting the bowler's scores and should permit updating of the scores without interruption of the image by the image-producing means such as a scorekeeper's hand or printing apparatus.

One approach has been to project bowling scores using a platen such as a right angle prism having an internally light-reflecting surface. Light is directed through one rectangular prism face toward the internally reflecting surface at approximately an angle not less than the critical angle of the prism to normally obtain generally total internal reflection or substantially total internal reflection of the light from the reflecting surface. The reflected light leaves the prism by another rectangular face and is thereupon directed by a suitable optical system to a viewing screen. The internal reflecting surface is used as the image source, i.e., the image to be projected is impressed on the exterior of the prism surface, as by temporarily adhering to the surface handwritten or mechanically printed information. Reflectivity is destroyed by the adherence, thereby creating the image.

In such systems, the image-producing means does not appear in the projected image, and images produced in the manner described may be regarded as acceptable but where the highest attainable degree of excellence is desired there may sometimes be an objectionable depth-of-field error. For example, where an image is reflected at an angle from a platen surface such as a prism surface, part of the image source appears (to an observer or to a projection lens) to be located closer than other parts because of its angular disposition with respect to the observer or lens, creating a depth-of-field error.

Where substantially the entire internally reflecting surface of the prism is used for an image source, as may be advantageous, the depth-of-field error is manifested in peripheral portions of the image where the top and bottom of the image surface are slightly out of focus, sufficiently to be noticeable by a critical viewer when the image is transmitted to a remote screen. The top and bottom of the prism face are considered to be those portions adjacent respectively to intersections of two rectangular faces of the prism. If the image at the top is focused, the image at the bottom becomes more out of focus, and the converse is also true. Thus, such systems may be focused so that a central band of the image is in focus on the viewing screen with the top and bottom portions being slightly out of focus.

With the above in mind, another object of this invention is to provide a new and useful projection system including correction for depth-of-field.

A more specific object is to provide a system of the type described wherein the depth-of-field correction is accomplished by positioning the apparent image as viewed by the projection lens so that a single lens can focus the entire image upon the screen.

Another object is to provide correction means in a system of the type described including added glass varying in thickness across the plane of the image to bring the apparently more distant portions of the apparent image apparently closer to the projection lens.

A further object is to provide a correction means of the type described including added glass in the form of an additional prism in the projection path adjacent to the exit surface of the prism, or alternatively to provide a continuous prism with a configuration to correct depth-of-field error.

Other objects of this invention will be apparent to those in the art from the following descriptions and the drawings in which:

FIG. 1 is a perspective view of a projector device for projecting bowling scores and embodying a form of the present invention;

FIG. 2 is a partial vertical section through the lower housing of the device of FIG. 1 along line 2—2 of FIG. 1;

FIG. 3 is a partial vertical section through the device of FIG. 1 along line 3—3 of FIG. 1;

FIG. 4 is a partial horizontal section through the upper casing of the device of FIG. 1 along line 4—4 of FIG. 3;

Figure 5:
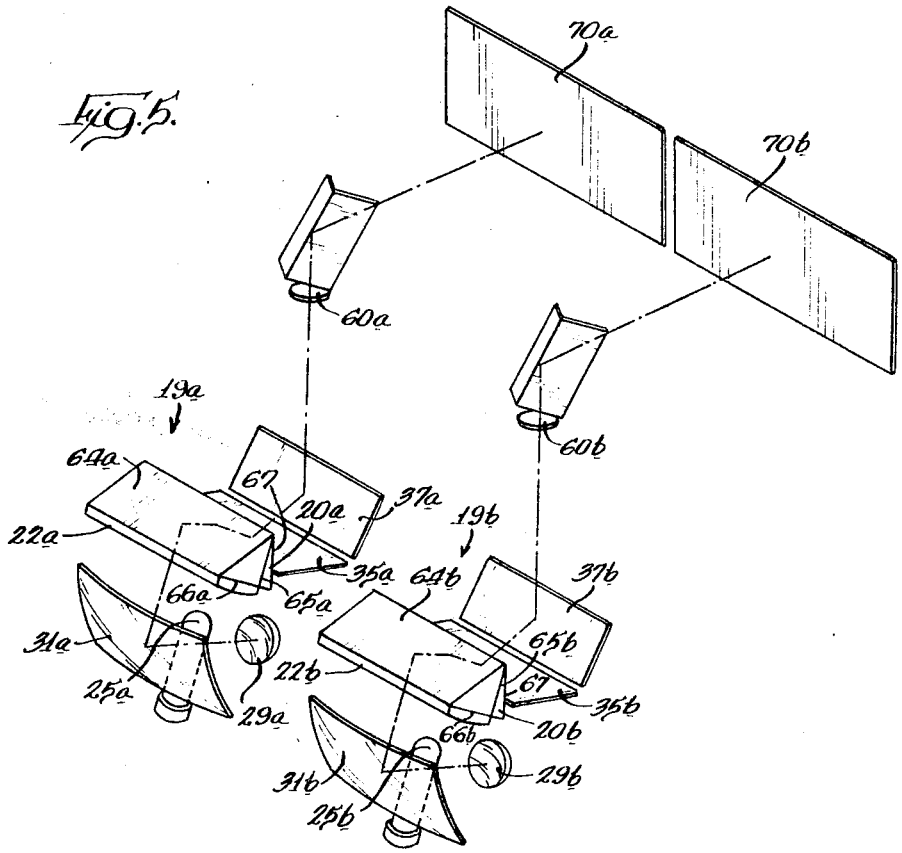
FIG. 5 is a perspective view showing a projection system usable in the device of FIG. 1 and including a form of depth correction in accordance with the present invention.

While an illustrative embodiment of the invention is illustrated in the drawings and will be described in detail herein, the invention is susceptible of embodiment in many different forms, and it should be understood that the present disclosure is to be considered as an exemplification of the principles of the invention and is not intended to limit the scope to the embodiment illustrated.

It is contemplated that the projection or viewing system of the present invention can be utilized in connection with one or more bowling lanes, e.g., by placement at the bowler's end of a bowling lane or plurality of adjacent bowling lanes, and that such bowling lane or bowling lanes may be equipped with automatic pinsetting and ball return equipment of conventional design and other equipment as may be desired.

Turning first to FIG. 1, there is illustrated a projector indicated generally by reference numeral 11 and including a lower casing or housing 12 for containing a light source and internally reflecting platen and an upper casing or housing 13 for containing a mirror and projection lens system. Casing 12 is supported from the floor or other suitable structure (not shown) by a pedestal 14 and the upper casing 13 is supported by a pair of support columns 15 from the top 16 of housing 12.

Referring now especially to FIGS. 2 and 3, casing 12 houses the light source and the image source platen of the illustrated system. It will be observed, especially with respect to FIG. 2, that the illustrated system includes a plurality of, i.e., two, projection system portions. Herein, whenever a reference numeral is given as identifying a component of one system, it is to be understood that a corresponding reference number in the other system describes the same or similar component. The drawings indicate the difference between the left-hand system and the right-hand system as viewed in FIG. 2 by letter suffixes $a$ and $b$ which may be used hereinafter in referring to the components in this specification. For example, a prism (see especially FIGS. 1 and 3) 19 is provided for each projection system with the drawings indicating reference numeral 19a for the left-hand system and 19b for the right-hand system; although the prism may be referred to hereinafter as "prism 19," it is to be understood that the appropriate one or ones of prisms 19a and 19b will be apparent from the context and the appropriate one or ones of the prisms is intended.

Prisms 19 has secured thereto another prism 20 to one face thereof and also has secured adjacent to another face thereof a condenser lens 22. The prism 20 and lens 22 are secured face to face as shown by suitable adhesive indicated at reference numeral 23. Adhesive 23 in its set state is transparent, a suitable adhesive for this purpose being cellulose acetate adhesive. The assembly of prism 19, prism 20 and condenser lens 22 is mounted by suitable brackets indicated by reference numeral 24 which slightly overlap the lateral edges of the assembly at the portions shown and which are eventually secured to casing 12 or top wall 16 by welds, bolts or other conventional means.

A light source in the form of a light bulb 25 is mounted by a suitable bracket 26. A curved reflector 29 mounted by bracket 30 adjacent bulb 25 is provided and disposed to reflect light from bulb 25 toward a preferably parabolic mirror 31 mounted by bracket 32. Both brackets 30 and 32 are mounted to bracket 26 which is in turn secured to wall 12. Reflector 29 and parabolic mirror 31 may be adjustable if desired; for example, parabolic mirror 31 is mounted to bracket 32 by means of a bolt and nut assembly 33a which may be loosened to pivot mirror 31 to a different position as desired for reflecting light from reflector 29 via mirror 31 into the surface of prism 19 having condenser lens 22 secured thereto. The wiring for projector light bulb 25 is conventional and the system is provided with a conventional dim-bright and on-off control 34.

A mirror 35 is disposed to receive light from the exit surface of prism 20 which is disposed on the exit surface of prism 19. Mirror 35 is mounted by a suitable bracket 36 secured to wall 12 and is positioned to reflect light from the prism 20 to impinge on mirror 37 which in turn reflects or directs the light upward. Mirror 37 is mounted by a bracket 38 to wall 12.

Mounted on the top surface of top wall 16, there is a frame member in the form of underframe 39 secured by screws 40 to wall 16 surrounding an opening in wall 16 best seen with reference to FIGS. 1 and 3. Underframe 39 has a central rectangular opening slightly smaller than the rectangular opening in wall 16 in which prism 19 is disposed so that underframe 39 serves as a flange member projecting over the top edges of prism 19.

A cover frame 41 is mounted to underframe 39 at the top edge thereof (with reference to FIG. 1) by means of hinge 42. Cover frame 41 is movable between an open position as illustrated in dotted lines in FIG. 3 and a closed position as illustrated by full lines in FIGS. 2 and 3. Cover 41 also has a generally central rectangular opening which is slightly smaller than the rectangular opening of underframe 39 so that when cover 41 is lifted to open position a score sheet the approximate size of the opening in underframe 39 may be placed on the upper face of prism 19 within the opening of underframe 39, and upon pivoting cover 41 to closed position, the score sheet will be held in place on the prism surface. The score sheet may be written or printed upon by hand or by other means through the opening in cover member 41 with cover member 41 in closed position.

Lower casing 12 is also provided with an exit port 43 disposed above mirror 37 and mirror 37 is positioned to reflect light from the prism and block assembly through the exit port 43 upward toward casing 13.

A blower 44 is mounted in the lower casing 12 by suitable means (not shown) and directs air toward a Y-shaped baffle which in turn baffles the air sideways as viewed in FIG. 2 toward each of projection bulbs 25 for cooling the light source areas of the two systems. Also mounted on suitable framework in casing 12 is a transformer 46 normally used in the wiring of a projection system including a light bulb and blower. The wiring of the present system is conventional and is not shown.

With reference now especially to FIGS. 3 and 4, casing 13, which is open or ported on one end thereof as indicated by reference numeral 49, houses a pair of mirrors 50 and 51 mounted by bracket 52 to casing wall 13. Mirrors 50 and 51 are held at 90° with respect to each other by bracket 52 and constitute a 90° mirror 53 with reflective faces disposed at right angles to each other. Mirror 53 is inclined at an angle sufficient to reflect light impinging thereon from below, toward and through port 49. Bracket 52 is pivotally mounted to a bifurcated end of frame member 54 my means of a bolt and nut assembly 55, which assembly when tightened secures frame 52 against pivoting and when loosened permits pivoting of bracket 52 thereabout for adjusting its incline. Thus, the forward incline of mirror 53 is adjustable, e.g., for direction of light to viewing screens at various heights.

It should also be noted that bracket 36, carrying mirror 35, is mounted to the side wall of casing 12 by thumb screw 57 threaded to and projecting inward from casing 12 through an arcuate slot in bracket 36. Bracket 36 is also hinged at 58 to suitable framework and mirror 35 is suitably attached to the bracket. By loosening screw 57, bracket 36 may be pivoted on hinge 58 to adjust the angular disposition of mirror 35 to direct light leaving the prism to mirror 37. Upon adjustment of mirror 35 to the correct angular disposition, screw 57 is retightened to clamp bracket 36 against casing 12.

Light reflected from mirror 37 leaves casing 12 through port 43 and is also directed by mirror 37 through an opening 59 in casing 13. Disposed across opening 59 is projection lens 60 secured by circumferential flange member 61 which is in turn attached to casing 13 by suitable screws shown at 62.

Referring now especially to FIGS. 3 and 5, in a projection system utilizing reflection from an internally reflecting prism surface, the light is passed through a first surface of the prism and is internally reflected from the second surface through the third surface of the prism. The second or internally reflecting surface of the prism is the image-receiving surface and corresponds to surface 64 of prism 19. The first surface is the light entrance surface 66 adjacent the condenser lens 22 for condensing the light beam entering the prism. The third surface is the exit surface from the prism or surface 65. In operation of such a projection system, normally a score sheet is disposed on the exterior face of the internally reflecting surface of the prism. The score sheet is backed with carbon or other pressure transfer material for transferring an image printed on the exposed surface of the score sheet to the surface 64 of the prism as described by Roop in co-pending application Serial No. 288,719, filed June 18, 1963, and assigned to the assignee of this application. The mark on the accessible or upwardly disposed surface of the score sheet, being produced by pressure on the score sheet surface, is transmitted to the surface 64 in the form of non-reflective carbon indicia or the like temporarily adhered to surface 64, corresponding to the indicia printed on the upper surface of the score sheet. The nonreflective areas of surface 64 created by the mark formed thereon destroy the inner reflectivity of this surface so that, as the light is internally reflected therefrom, an image of the indicia is carried by the reflected light from the prism.

A depth-of-field error results from the angular disposition of the image source at the prism face 64 relative to the path of the image reflected toward projection lens 60. That is, the image source at the prism surface 64 is disposed in a plane inclined from a plane normal to the projection path, so that portions of the image, namely those portions at the left in FIG. 3, are further away, and appear to the lens to be further away from the lens than those portions at the right in FIG. 3 in the absence of correction means. The result of such angular disposition of the image source is that lens 60 cannot focus the entire depth of the image from top to bottom.

According to the present invention, correction means is provided whereby the image source is adjusted to an apparent position such that all portions thereof are sufficiently close to a plane normal to the projection path that the single projection lens 60 is able to satisfactorily focus the entire image on a viewing screen.

In order to explain the correction means, it should be understood that, while the actual image source lies in the plane of the prism surface 64, in the absence of correction means the apparent image source does not lie in such a plane but more nearly in a plane represented in FIG. 3 by the broken line $i_1$. This follows by virtue of the fact that the light is reflected from the surface 64 to the projection lens through the prism and in passing through the glass-air interface (in the absence of glass prism 20) at the surface 65 into the less dense medium, the source appears to be located closer to the interface than it actually is. Since different portions of the image pass through varying thicknesses of prism glass, different portions will appear to be at varying distances from the actual source as indicated approximately by the line $i_1$. Even though the apparent image is less objectionably angularly disposed than the actual image source, the lens 60 cannot focus the entire image.

It can be shown that the distance along the projection path from the surface 65 to the surface 64 at any point in the image is related to the distance from the surface 65 to the plane $i_1$ as expressed in the following formula:

(1) $$\frac{t}{y} = \frac{\cos Q}{\sqrt{X^2 - \sin^2 Q}}$$

wherein:

$y$ = the distance along the projection path from the surface 65 to the surface 64 at any point in the image, $t$ = the distance along the projection path from the surface 65 to the plane $i_1$ at the same point in the image, $X$ = the refractive index of the glass of prism 19, and $Q$ = the exit angle of light from the surface 65.

For small exit angles, as will usually occur, $\cos Q$ approaches 1, and $\sin Q$ approaches zero, so that for practical purposes the formula may be:

(2) $$\frac{t}{y} = \frac{1}{X}$$

In accordance herewith, the apparent image is moved to a position from which it can be properly focused across the whole area thereof by means of the projection lens 60. Movement or adjustment of the image as viewed from lens 60 in the illustrated embodiment is accomplished by means of the prism 20 inserted in the projection path adjacent face 65. The prism functions to change the disposition of the apparent image by moving the same to a plane, as at $a-b1$ in FIG. 6, for example, substantially normal to the projection path.

FIG. 5, for simplicity, shows the disposition of the optical system employing the error correction means with the casing, brackets and other associated elements removed. Referring now especially to FIGS. 3–5, the light path from the light source to a viewing screen 70, as illustrated by broken lines, will be understood. Specifically, light from source 25 is reflected from reflector 29 and directed by parabolic mirror 31 through condenser lens 22 and through face 66 of prism 19 and is reflected from internally reflecting surface 64. The light beam picks up the image from surface 64 as it is reflected therefrom and the internally reflected image leaves the prism through face 65. The image as illustrated in FIG. 5 leaving face 65 proceeds through prism 20 and then is reflected from mirrors 35 and 37. Prism 20 serves to reorient the apparent image as viewed by projection lens 60 so that the total image is within focus with respect to lens 60 for projection to screen 70. Thus, the reflected image from mirrors 35 and 37 passes through lens 60, and is thereafter reflected by mirror 53 onto screen 70 and the projected image on screen 70 is corrected with respect to depth of field.

Figure 6:
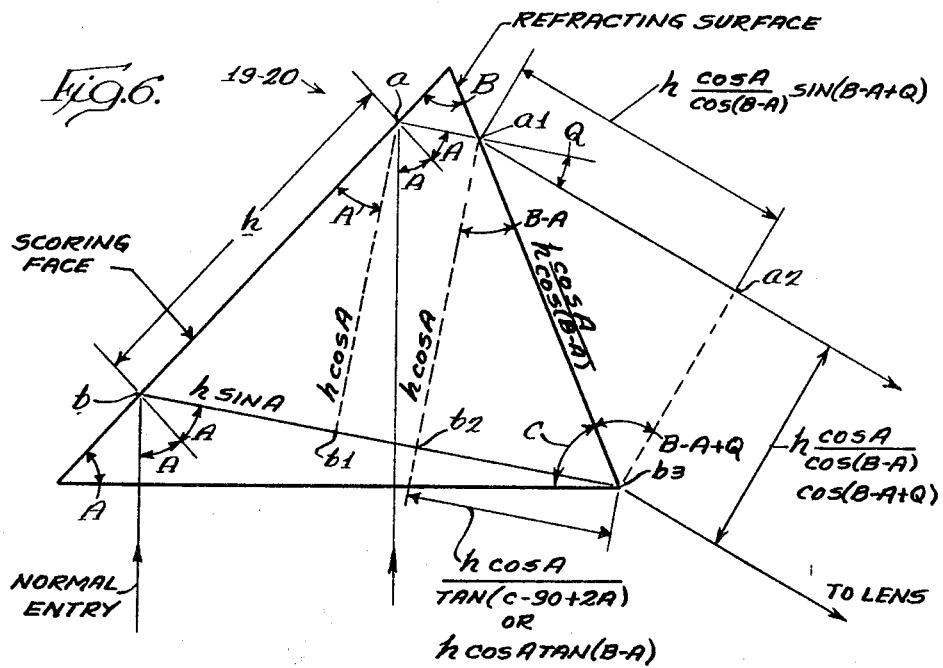
FIG. 6 is an end elevation of a continuous prism providing depth-of-field correction according to this invention, and including trigonometric solutions referred to hereinafter.

Referring to FIG. 6, the three internal angles of the total prism comprised of prism portions 19 and 20 are identified as A, B and C, respectively. An example of calculation of these angles will be given, and in the calculation, the prism portions 19 and 20 are considered as a single depth of field compensated prism and it is to be understood that a single prism as in FIG. 6 can be and preferably is used in lieu of the two separate portions which are in effect built up in FIG. 3 to provide a single prism.

In FIG. 6, $h$ is the height of the image area to be used on surface 64,

A is the angle between faces 64 and 66 of the prism,

B is the angle between faces 64 and 67 of the prism,

C is the angle between face 67 and face 66 of the prism, and $Q$ is the angle of refraction at the surface 67.

In an actual embodiment constructed, the angle A equals 42.2°, the angle B equals 69.8° and the angle C equals 68.0°, the index of refraction is 1.648, and the height of the surface 64 is 4 inches, and the apparatus produces very satisfactory results.

At the outset, it is desirable to select an optical material with a refractive index (X) as high as possible considering such characteristics as color, costs, and susceptibility to bubbles, striae and straining, for reasons which will become apparent.

Where the light enters surface 66 normal thereto, the prism angle A is equal to the angle of reflection, that is, the angle between the line of reflection from surface 64 and a line normal to the surface 64 at the point of reflection. The critical angle of reflection at the surface 64 for the material chosen may be expressed as $\sin^{-1}(1/X)$. To assure the reflection of all desirable light, the angle A should be made larger than the critical angle. Specifically, it should preferably be larger by the amount of one-half the angle subtended by the diameter of the lens on the scoring area (about 3° in this instance) plus a safety margin of 1° to 2°. A minimal value is desirable for this angle in order to achieve a minimum foreshortening of the projected image height.

After determination of the prism angle A according to the principles set forth above, the other angles should be determined to provide depth of focus compensation. Referring to the trigonometric analysis in FIG. 6, for proper focus the optical path length $a-a1-a2$ must be equal to the optical path length $b-b1-b2-b3$. Since $a-a1$ equals $b1-b2$, it follows that $a1-a2$ should equal the sum of $b-b1$ and $b2-b3$. The last three mentioned lengths are defined trigonometrically in FIG. 6. Accordingly, bearing in mind that all distances through the glass prism are optically shortened by the product of $1/X$ according to Equation 2 above, (3)
$$\frac{h}{X}(\sin A + \cos A \tan (B-A)) = h\frac{\cos A}{\cos (B-A)} \sin (B-A+Q)$$

Also, according to the law of refraction, (4) $X_{\text{glass}} \sin (B-A) = X_{\text{air}} \sin (B-A+Q)$ Combining these two equations, (5)
$$\sin A + \cos A \tan (B-A) = X^2 \frac{\cos A}{\cos (B-A)} \sin (B-A)$$

or (6) $$\tan B = \frac{X^2 \tan A}{X^2 - 1 - \tan^2 A} = \frac{\sin 2A}{2\left(\cos^2 A - \frac{1}{X^2}\right)}$$

Substituting in Equation 6 the information previously made available concerning angle A, and B can readily be determined following which angle C may be obtained.

The trigonometric analysis in FIG. 6 indicates that the effective image height at $b3-a2$ will be equal to the actual scoring area height $h$ foreshortened by the factor (7) $$\frac{\cos A}{\cos (B-A)} \cos (\sin^{-1}(X \sin (B-A)))$$

While explanations have been given for selecting the angles of a suitable prism for correcting depth-of-field error, it is intended that such angles need not initially be exact since acceptable correction may be obtained short of exactness in some instances. Further, projection lenses may be at least partially depth-of-field corrected and in some cases provide final correction where only partial correction is provided by the prism configuration itself.

What is claimed is:

1. A projection system including a light source, an internally reflective platen and a viewing screen, wherein light from the light source is directed through the internally reflective platen toward an internally reflecting platen surface to the viewing screen to transmit an image from said reflecting surface to said screen and wherein said platen includes a light transmitting surface in a plane angularly disposed relative to the reflecting surface, intersecting the plane of said reflecting surface at an edge and permitting passage of light therefrom reflected from said reflecting surface, a projection lens for projecting the reflected light passing from said platen to the viewing screen, the angle of intersection of said planes being sufficiently open to include means positioning the apparent image surface as viewed by said projection lens in an apparent image plane disposed within a distance range from said lens for projection by said lens to said screen in the same general depth of field.

2. A projection system comprising a light transmitting prism having an internally reflecting surface for receiving a legend externally on said surface, and a light source and optical means associated therewith for directing light into said prism through a second surface of the prism and through said prism toward said sheet, and transmitting an image of said legend reflected through said prism exiting from a third surface of the prism to a viewing screen, said second and third surfaces being at acute angles to the internally reflecting surface and said prism having an angle A between the internally reflecting surface and the second surface and an angle B between said internally reflecting surface and the third surface, angle B being sufficiently open and approximate to its definition in the following formula:

$$\tan B = \frac{X^2 \tan A}{X^2 - 1 - \tan^2 A}$$

wherein X is the refractive index of the prism material, to move the effective image plane from said internally reflecting surface to a position at least partially correcting depth of field error in the transmitted image on said viewing screen.

3. The projection system of claim 2 in which said prism comprises a plurality of joined prism portions.

4. The projection system of claim 2 wherein said prism consists of two right angle prism portions joined face-to-face to each other at a transparent juncture at faces adjacent the right angles thereof with said right angles having leg faces comprising the second surface of said prism.

5. The projection system of claim 2 wherein angle A is one-half the angle between impinging and reflected light at the internally reflective surface.

6. The score projection system of claim 2 wherein X is about 1.6, A is about 40° and B is about 70°.

7. A projection system comprising a light transmitting prism having an internally reflecting surface for receiving a reflectivity destroying mark thereon, a light source and means associated therewith for directing light through said prism toward said internally reflecting surface and reflecting an image therefrom exiting from the prism through a second surface of said prism, means including a projection lens for directing the image from the prism to a viewing screen, and triangular prism means in the path of light exiting from said second surface between the prism reflecting surface and projection lens for at least partially correcting depth of field error in the reflected image as viewed by the projection lens.

8. A projection system comprising a light transmitting prism having an internally light reflecting surface for backing a sheet adapted to impress a legend thereon, means for holding a sheet against said backing surface, and a light source and optical means associated therewith for directing light into said prism through a surface thereof other than said sheet backing surface, and through said prism toward said sheet, and transmitting an image of said legend reflected through said prism to a viewing screen, said optical means comprising projection lens means and said prism including means rotating the entire effective image plane as a single entity in the prism as viewed by the projection lens toward a position correcting depth of field error in the projected image.

9. A projection system comprising a light transmitting prism having an internally reflecting surface for backing a printable sheet adapted for impressing a legend on said surface responsive to pressure on said sheet, means for holding a sheet against said backing surface, a light source, curved mirror means for directing light from said light source into said prism through a second surface thereof other than said sheet backing surface and through said prism toward said sheet backing surface and transmitting an image of the legend from said sheet reflected through said prism and outwardly from a third surface of said prism, a plurality of mirror means for directing reflected light from said prism upward, by-passing said prism to a position substantially above said reflecting surface, and projection lens means disposed to project and focus the reflected light on a viewing screen, said prism having two of its three angles defined by the relationship:

$$\tan B = \frac{X^2 \tan A}{X^2 - 1 - \tan^2 A}$$

wherein X is the refractive index of the material of said prism and A and B are angles of said prism between said first and second surfaces and first and third surfaces respectively, A being less than 90° and at least equal the critical angle of reflectivity of said first surface, said angle B being sufficiently open to pivot the effective image plane as viewed by the projection lens to a position correcting depth of field error.

10. A projection system for projecting images separately from a plurality of separate image receiving surfaces, which comprises a plurality of light transmitting prisms each having an internally reflecting surface, the exterior of which constitutes one of said separate image receiving surfaces, each of said image receiving surfaces being disposed for backing a sheet adapted to transmit a legend impressed on the exposed surface thereof to said image receiving surface, means for releasably holding a sheet against each of said backing surfaces, a light source, curved mirror means for directing light from said light source through a second surface of each of said prisms toward each of said first-mentioned internally reflecting surfaces for reflecting an image of said legend therefrom and exteriorly through a third surface of the prism, mirror means for separately directing the reflected image from each of said reflecting surfaces toward a viewing screen, separate projection lens means for focusing the image from each prism on a viewing screen, said three prism surfaces having opposing parallel edges, the prism angles between first and second surfaces being less than 90° but sufficiently open to permit directing of light from the exterior of the second of said surfaces to impinge the first of said surfaces at an angle greater than the critical angle of reflection at said first surface, said first and second surfaces being adjacent to said one angle, a second of the prism angles adjacent the opposing edge of said first surface being sufficiently wider than that between said first surface and an imaginary plane dropped from the apex of said second angle perpendicular to said second surface to move the apparent image of said first surface as viewed through the third prism surface by the respective projection lens toward said projection lens a sufficient distance for focusing by the lens.

11. A projection system comprising a plurality of light transmitting prisms each having an internally reflecting surface for backing a sheet adapted to transmit a legend impressed on the exposed surface thereof to said backing prism surface, a light source, curved mirror means for directing light from said light source into each of said plurality of prisms through a surface thereof other than said sheet backing surface and through said prism toward said sheet and transmitting an image of said legend reflected through said prism from said prism, mirror means for directing the reflected images from each backing surface to a position above said prism, separate right angle mirror means at said position for separately directing images from separate prisms, projection means for projecting the images toward separate viewing screens and prism means secured to each prism in the light path between the prism and projection means for correcting depth of field in each reflected image as the image is transmitted from the prism.

12. In a projecting apparatus, in combination, a light transmitting prism having a first surface adapted for transmitting light from outside the prism to the interior of the prism, a second surface for normally reflecting light transmitted thereto through said first surface and a third surface for transmitting light reflected from said second surface to the exterior of the prism, means for directing light to the prism through said first surface and to said second surface so that upon the impression of a legend on the second surface reflectivity thereof is destroyed in portions corresponding to the legend and an image of the legend is reflected outwardly from the prism through the third surface thereof, and optical means for transmitting the image from the prism to a viewing surface, including projection lens means associated with the image transmitted from said third surface for projecting the image to the viewing surface, said prism having an angle between said second and third surfaces providing additional glass in the prism portion within the light path from the light reflecting surface for pivoting the apparent image as viewed by the projection lens as an entity substantially to a plane normal to the projection path completely within the focus of said projection lens, thereby to correct depth of field error in the image transmitted to the viewing surface.

13. A projection apparatus as defined in claim 12 wherein the prism has an angle between the first surface and the second surface at least equal to the critical angle of reflection at the second surface.

14. A projection apparatus as in claim 13 wherein the relationship of the angle A between the first and second surfaces of the prism to the angle B between the second and third surfaces of the prism is expressed as follows:

$$\tan B = \frac{X^2 \tan A}{X^2 - 1 - \tan^2 A} = \frac{\sin 2A}{2\left(\cos^2 A - \frac{1}{X^2}\right)}$$

15. A prism comprising three faces with opposing parallel edges, said prism being triangular in end view, one of the prism angles being less than 90° but sufficiently open to permit directing of light from the exterior of a first of said faces through the first face to impinge a second of said faces at an angle greater than the critical angle of internal reflectivity at said second face, said first and second faces being adjacent to said one angle, a second of the prism angles adjacent the opposing edge of said second face being sufficiently wider than the imaginary angle formed by an imaginary plane dropped from its apex perpendicular to said first face to move the apparent image of said second face as viewed by a lens through the third prism face toward said third face a sufficient angular distance for focusing by said lens.

16. A light transmitting prism having three planar faces, triangular in end view with angles A, B and C comprising the angles of the triangle and extending along parallel edges of said prism defining the heights of said faces, the first face between angles A and B constituting an internally reflective interface for reflecting light entering generally perpendicular through the second face between angles A and C to exit the reflected light through the third face between angles B and C, said angle A being sufficient to permit impinging of light internally at said first face at an angle greater than the critical angle of reflectivity at said first face and said angle B being related to said angle A approximately by the formula:

$$\tan B = \frac{X^2 \tan A}{X^2 - 1 - \tan^2 A}$$

or $$\frac{\sin 2A}{2\left(\cos^2 A - \frac{1}{X^2}\right)}$$

wherein X is the refractive index of the material of said prism.

17. A light transmitting prism comprising two prism portions joined face-to-face with each other along the height of one face of each, said first prism portion comprising a right angle prism having an angle A defining one edge of the hypotenuse, said second prism portion comprising a right angle prism having an angle C defining one edge of the hypotenuse, the third angle of said first and second prism portions being respectively 90° minus A and 90° minus C, the juncture of said prism portions being light transmitting and being between the faces extending from the apexes at the third angles to the right angles, said joined faces being of approximate equal height, said third angles constituting a total angle of B, wherein:

$$A + B + C = 180°$$

$$\tan B = \frac{X^2 \tan A}{X^2 - 1 - \tan^2 A}$$

and X = the refractive index of the prism material.

18. A prism comprising a plurality of prism portions, light transmitting means joining said prism portions, said prism having two of its three angles defined by the relationship:

$$\tan B = \frac{X^2 \tan A}{X^2 - 1 - \tan^2 A}$$

wherein X is the refractive index of the material of said prism and A and B are angles of said prism, A being less than 90° and at least equal the critical angle of reflectivity of an adjacent face.

(References on following page)

References Cited by the Examiner

UNITED STATES PATENTS

| | | | |
|---|---|---|---|
| 1,319,292 | 10/1919 | Kunz | 88—1 |
| 2,195,699 | 2/1940 | Johnson | 88—24 |
| 2,944,461 | 7/1960 | Howell et al. | 88—24 |
| 3,138,059 | 6/1964 | White | 88—24 |
| 3,174,414 | 3/1965 | Myer | 88—24 |
| 3,200,701 | 8/1965 | White | 88—24 |

FOREIGN PATENTS

| | | |
|---|---|---|
| 1,279,317 | 11/1960 | France. |
| 432,240 | 7/1926 | Germany. |
| 929,675 | 6/1963 | Great Britain. |

NORTON ANSHER, *Primary Examiner.*

V. A. SMITH, *Assistant Examiner.*